June 7, 1966  D. B. GARDNER  3,254,668
PRESSURE RELIEF VALVE HAVING AUXILIARY REACTOR SURFACE
Filed Feb. 25, 1964
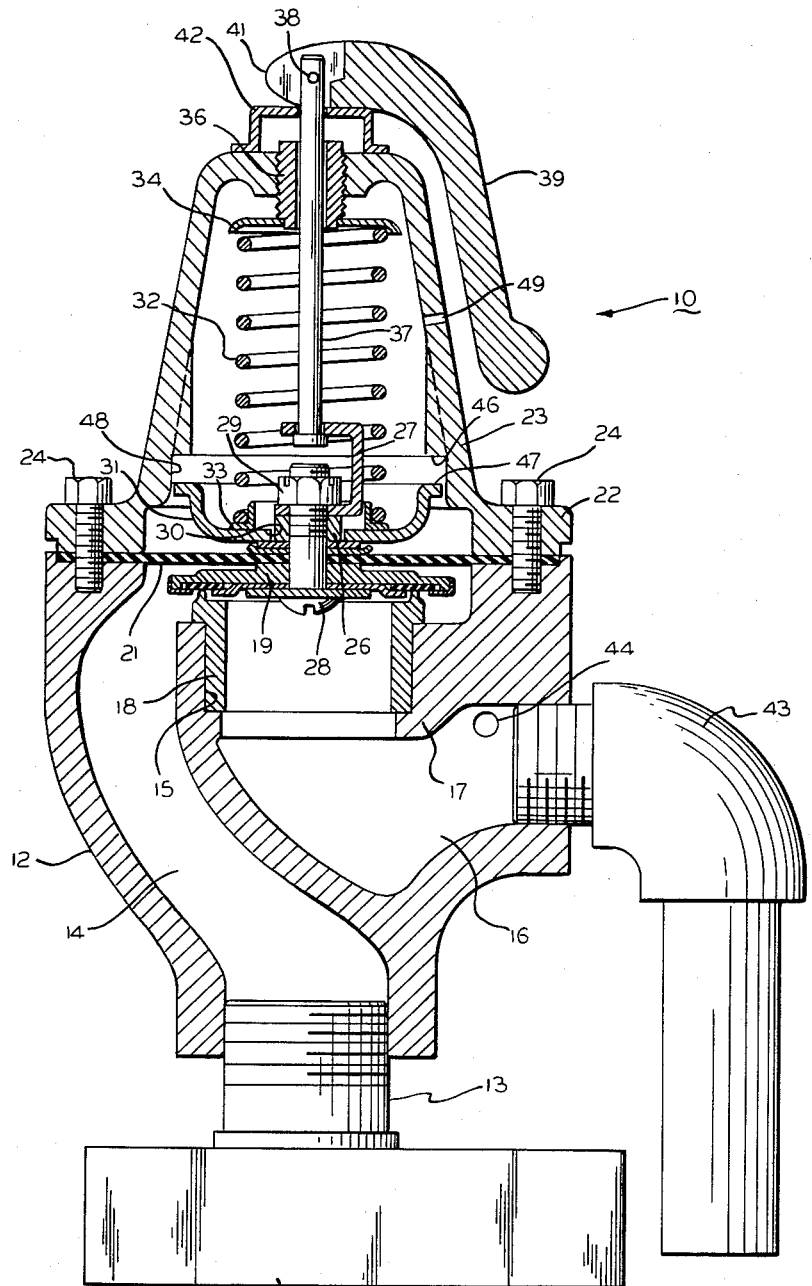
INVENTORS
DONALD B. GARDNER
BY
*Chas. L. Lindberg*
ATTORNEY United States Patent Office 3,254,668
Patented June 7, 1966

3,254,668
PRESSURE RELIEF VALVE HAVING AUXILIARY REACTOR SURFACE
Donald B. Gardner, Mount Prospect, Ill., assignor to International Telephone and Telegraph Corporation, a corporation of Maryland
Filed Feb. 25, 1964, Ser. No. 347,249
1 Claim. (Cl. 137—510)

This invention relates to pressure relief valves of the diaphragm type, and relates to improved structure for insuring that the valve will open to full discharge position upon failure of the diaphragm for any reason.

It is a particular object of this invention to provide an improved diaphragm operated relief valve which moves the valve closure member to full discharge position upon failure of the diaphragm.

Another object is to provide a diaphragm operated relief valve characterized by a spring plate bearing against a valve disk assembly arranged to hold the diaphragm therebetween, the spring plate moving against a plurality of stops formed in the valve bonnet, the spring plate having a diameter but slightly smaller than the internal diameter of the bonnet below such stops to insure a large pressure differential across the spring plate upon failure of the diaphragm, thereby insuring that upon failure of the diaphragm the valve will be maintained in fully opened discharge position.

Other objects and important features of the invention will be apparent from a study of the specification following taken with the drawing, which together describe and illustrate a preferred embodiment of the invention and what is now considered to be the best mode of practising the principles thereof. Other embodiments of the invention may be suggested to those having the benefit of the teachings herein, and such embodiments are intended to be reserved, especially as they fall within the scope and purview of the subjoined claim.

In the drawing:

The single figure shows an improved pressure relief valve according to the present invention, the valve being shown in operative relationship with respect to a hot water boiler.

Referring to the drawing, the improved valve according to the present invention is designated generally by the reference numeral 10, and is shown in operative relationship to a hot water boiler 11, such as may form part of a hot water heating system. The valve 10 includes a body member 12 connected by a short nipple 13 to the boiler 11. The body member 12 has an inlet passageway 14 and an outlet passageway 16, there being a partition 17 between the two passageways 14 and 16. Partition 17 has an opening 15 therein to receive an annular valve seat 18 supported on the partition 17. A valve disk assembly 19 is adapted to close on the seat 18 to maintain pressure at a predetermined level in boiler 11.

Valve disk 19 is part of a valve operating assembly including a diaphragm 21 which is held along its periphery between the valve body 12 and a rim flange 22 of a valve bonnet 23. Cap screws 24 hold the diaphragm 21 and the bonnet 23 to the valve body 12.

The diaphragm 21 is held at the inner part thereof between an assembly comprising a washer stack 26 and a lifter link 27, the assembly being held together by means of a bolt 28 and a nut 29 bearing against the lifter link 27.

A generally cup-shaped spring plate 31 has a central aperture 30 so as to nest around washer stack 26, and is urged against the washer assembly 26 and disk 19 by a spring 32 having its lower end guided in a flanged cup 33, also nested around washer stack 26, and its upper end bearing against an upper spring seat 34. Adjustment of the tension in the spring 32 is achieved by a hollow adjusting nut 36 threaded into the top of the bonnet 23 and bearing against spring seat 34.

For purposes of manually opening the valve assembly thus far described to the discharge position, the lifter link 27 is connected to a stem 37 loosely connected at its lower end to the lifter link 27. The stem 37 extends through the hollow adjusting nut, and is connected by a pin 38 to an operating handle 39. A cam nose 41 on one end of the operating handle 41 operates with a closure 42 for bonnet 23 so that the rocking of the handle in a counterclockwise direction will lift the stem 37 and the valve disk 19 from its seat 18.

During the normal operation of the valve 10, the pressure against the lower side of the diaphragm 21 is opposed by the pressure in the spring 31. In the normal operation, if there is an excess of pressure at the boiler 11, it will be relieved past the valve disk 19, so that pressure will be relieved in the passage 14 to the outlet passage 16. It may be noted that the outlet passage 16 is connected to a discharge pipe 43. A small vacuum opening 44 in the discharge passageway 16 operates to break any vacuum which conceivably could be manifest against the lower side of the valve disk 19, and cause the valve 10 to operate at a pressure in excess of which it was designed for.

However, under conditions when the diaphragm ruptures or malfunctions for some reason, as by reason of excessive age, structure is provided for insuring that such malfunction of the diaphragm 21 will not cause the valve to operate to less than a fully open position. This is important because of the fact that if the boiler is at an excess pressure, such pressure must be relieved rapidly, and upon failure of the diaphragm it must not impede the rapid dissipation of pressure from the boiler 11.

To foregoing end, the interior of the valve bonnet 23 is provided with a plurality of vertical extending ribs 46, the bottom ends of which serve as stops for an annular flange 47 on the cup-shaped plate 31. It may be noted that the interior diameter 48 of bonnet 23 below ribs 46 is but slightly greater than the diameter of annular flange 47, so that full pressure is effective against plate 31 with but very slight leakage therepast.

If the diaphragm ruptures for some reason or other, full pressure will be manifest against the cup-shaped plate 31 to cause the same to move against the load in the spring 32 to bottom against the lower ends of the ribs 46. In order to insure that there is no back pressure opposing such movement the bonnet 23 has a small relief aperture 49 therein for relief of such back pressure. By reason of the fact that the diameter of the flange 47 is substantially the same as the internal diameter 48, little pressure will be relieved past spring plate 31, and substantially all of the pressure at inlet passage 14 is effective to move against the bottom of the ribs 46.

It will be apparent, therefore, that upon rupturing or other malfunction of the diaphragm 21, that full opening of the valve will be had instead of partial opening thereof. While the invention has been described in terms of a preferred embodiment thereof, its scope is not intended to be limited by the precise embodiment herein shown, nor otherwise by the claim here appended.

I claim:

A pressure relief valve comprising a valve body having an inlet and an outlet and a valve seat between said inlet and outlet, a valve disk operatively related to said seat, a valve bonnet secured to said valve body, a diaphragm secured to said valve disk and having the periphery thereof secured between said valve body and said valve bonnet, said diaphragm being subject on the disk side thereof to the inlet pressure, a spring plate bearing against the opposite side of said diaphragm, spring means acting between said bonnet and said spring plate and normally urging said disk against said seat, the diaphragm and spring means being responsive to a predetermined inlet pressure moving the disk away from said seat, and structure providing for the operation of said valve to full relief opening upon rupture of said diaphragm comprising plurality of stops within said bonnet and marginal portions on said spring plate adapted to close against said stops, the diameter of said spring plate being slightly smaller than the inside diameter of said bottom adjacent said stops, so that upon rupture of said diaphragm substantially no pressure will be relieved past said spring plate to insure said spring plate moving to seating position against said stops, said bonnet being provided with a vent to atmosphere at a point behind said stops, so that said spring plate may freely move to arrested position upon rupture of said diaphragm.

References Cited by the Examiner

UNITED STATES PATENTS

| | | | |
|---|---|---|---|
| 1,210,913 | 1/1917 | Dougherty | 137—510 X |
| 2,103,725 | 12/1937 | Jacobsson | 137—510 |
| 2,286,713 | 6/1942 | Burks | 137—510 X |
| 2,603,231 | 7/1952 | Birkemeier | 137—510 X |
| 2,639,194 | 5/1953 | Wahlin | 137—510 X |
| 3,094,281 | 6/1963 | Myers | 137—510 X |
| 3,106,219 | 10/1963 | Teston | 137—510 |

ISADOR WEIL, *Primary Examiner.*

H. WEAKLEY, *Assistant Examiner.*